United States Patent [19]

Pospischil

[11] Patent Number: 4,669,118
[45] Date of Patent: May 26, 1987

[54] SELF-SYNCHRONIZING DESCRAMBLER

[75] Inventor: Reginhard Pospischil, Gräfelfing, Fed. Rep. of Germany

[73] Assignee: Siemens Aktiengesellschaft, Berlin and Munich, Fed. Rep. of Germany

[21] Appl. No.: 784,685

[22] PCT Filed: Feb. 1, 1985

[86] PCT No.: PCT/DE85/00026

§ 371 Date: Sep. 25, 1985

§ 102(e) Date: Sep. 25, 1985

[87] PCT Pub. No.: WO85/03611

PCT Pub. Date: Aug. 15, 1985

[30] Foreign Application Priority Data

Feb. 2, 1984 [DE] Fed. Rep. of Germany ....... 3403639

[51] Int. Cl.⁴ .......................... H04K 1/02; H04L 9/04
[52] U.S. Cl. ........................................ 380/43; 380/44; 380/46; 380/47
[58] Field of Search ............... 178/22.13, 22.14, 22.19, 178/22.16, 22.17

[56] References Cited

U.S. PATENT DOCUMENTS 4,434,322  2/1984  Ferrell .............................. 178/22.14

FOREIGN PATENT DOCUMENTS 2410921  6/1979  France .
1591805  6/1981  United Kingdom .

OTHER PUBLICATIONS

Elektronik, vol. 32, No. 26, (12/30/83) Munich (DE) Hermes et al, "Parallel ... Scrambler ... pp. 67–70 (see 68).

Primary Examiner—Salvatore Cangialosi

[57] ABSTRACT

For the purpose of suppressing DC components and high energy components at different frequencies, digital signals are frequently transmitted in scrambled form. The realization of corresponding scramblers and descramblers is involved and difficult at high transmission rates. A self-synchronizing descrambler is provided which, due to parallel processing of the digital signals to be descrambled, has a relatively low working speed and is easy to manufacture in integrated technology. The descrambler employs a plurality of descrambler stages each including first and second modulo-2 adders and a shift register stage.

3 Claims, 3 Drawing Figures

4,669,118

SELF-SYNCHRONIZING DESCRAMBLER

BACKGROUND OF THE INVENTION

1. Field of the Invention

The present invention relates to a self-synchronizing descrambler comprising n clocked shift register stages for descrambling a signal having a scrambler period of $2^n-1$ bits, whereby the output of at least one shift register stage is connected to the input of at least one modulo-2 adder.

2. Description of the Prior Art

Pulse patterns having a disturbing DC component or a particularly high energy component at other, discrete frequencies can occur in digital signal transmission insofar as involved recodings are not undertaken. In order to avoid these patterns, the digital signal to be transmitted is scrambled at the transmitting side by a modulo-2 addition with a pseudo-random sequence. The descrambling occurs at the receiving side by a further modulo-2 addition with the pseudo-random sequence employed at the transmitting side. The synchronization of the pseudo-random generators employed at the transmitting and receiving side which is thereby necessary can be avoided by employing free-wheeling and, therefore, self-synchronizing scrambler and descrambler arrangements.

With the further expansion of the digital telecommunications system, the necessity of constructing the scrambler arrangement and the descrambler arrangement for digital signals having the high transmission rate arises.

"Siemens Forschungs-und Entwicklungsberichte", Vol. 6, No. 1, 1977, pp. 1-5, fully incorporated herein by this reference, discloses a possibility for constructing scrambler and descrambler arrangements for pulse code modulated (PCM) signals having a high clock frequency. The PCM signals are thereby scrambled in a plurality of parallel channels having a comparatively lower bit repetition frequency and the scrambled signals are combined to form the transmission signal by multiplexing. The demultiplexer is analogously provided at the receiving side, the parallel descrambling in a plurality of channels having a low bit repetition frequency following thereat. In addition to the high expense, the necessity of synchronizing multiplexers and demultiplexers with one another occurs in such a solution.

SUMMARY OF THE INVENTION

The object of the present invention, therefore, is to provide self-synchronizing descramblers for the transmission of digital signals having a high bit repetition frequency, the expense of these descramblers being reduced particularly by omitting a demultiplexer.

The above object is achieved, according to the present invention, in a self-synchronizing descrambler of the type initially set forth and which is particularly characterized in the n parallel inputs for respectively one of n parallel bits of the scrambled digital signal are provided; in that the inputs are ordered corresponding to the sequence of incoming bits with the $n^{th}$ bit at the first input and the following bits at the next inputs and are connected to a respective scrambler stage; and in that the descrambler stages respectively contain a shift register stage as well as first and second modulo-2 adders. The descrambler is further characterized in that the output of the shift register stage is connected to the first input of the first modulo-2 adder and the output of the first modulo-2 adder is connected to the first input of the second modulo-2 adder; in that the second input of the second modulo-2 adder is connected to the assigned input for the scrambled digital signal and to the input of the shift register stage contained in the same descrambler stage; and in that the output of the second modulo-2 adder represents the output of the respective scrambler stage for the descrambled digital signal. The descrambler is further characterized in that, in all descrambler stages up to the $(n-m+1)^{th}$, the second input of the first modulo-2 adder of the one descrambler stage is connected to the output of the shift register stage of the descrambler stage for the $m^{th}$ bit; in that m is smaller than n and is a whole number, in that, at the $(n-m)^{th}$ descrambler stage, a connection occurs from the second input of the first modulo-2 adder to the shift register stage of the $n^{th}$ descrambler stage and from the $(n-m-1)^{th}$ descrambler stage to the $(n-1)^{th}$ descrambler stage; in that the individual bits of the descrambler digital signal can be taken at the output of the modulo-2 adders; and in that the clock inputs of the shift register stages are connected to a source for a clock signal whose frequency is the $(1/n)^{th}$ portion of the bit clock frequency of the digital signals.

The surveyable structure of purely digital elements which significantly facilitates integration is particularly advantageous in practicing the present invention, even given long descramblers. Preferred embodiments of the descrambler of the present invention for digital signals having a scrambler period of 127 or of 31 bits are set forth below in greater detail.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
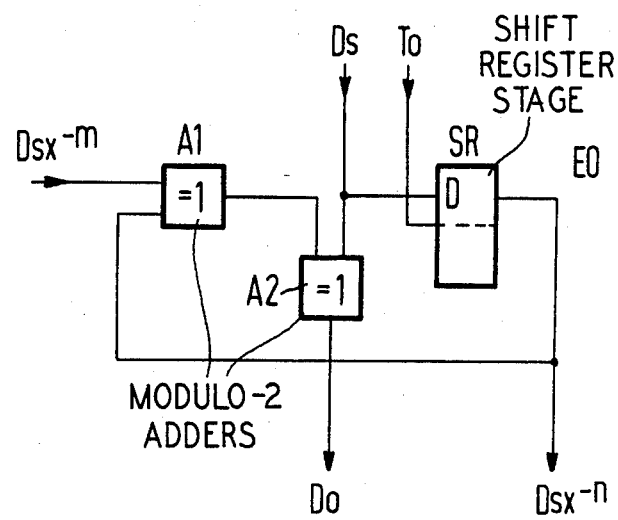
FIG. 1 is a schematic circuit diagram of an individual descrambler stage.
Figure 2:
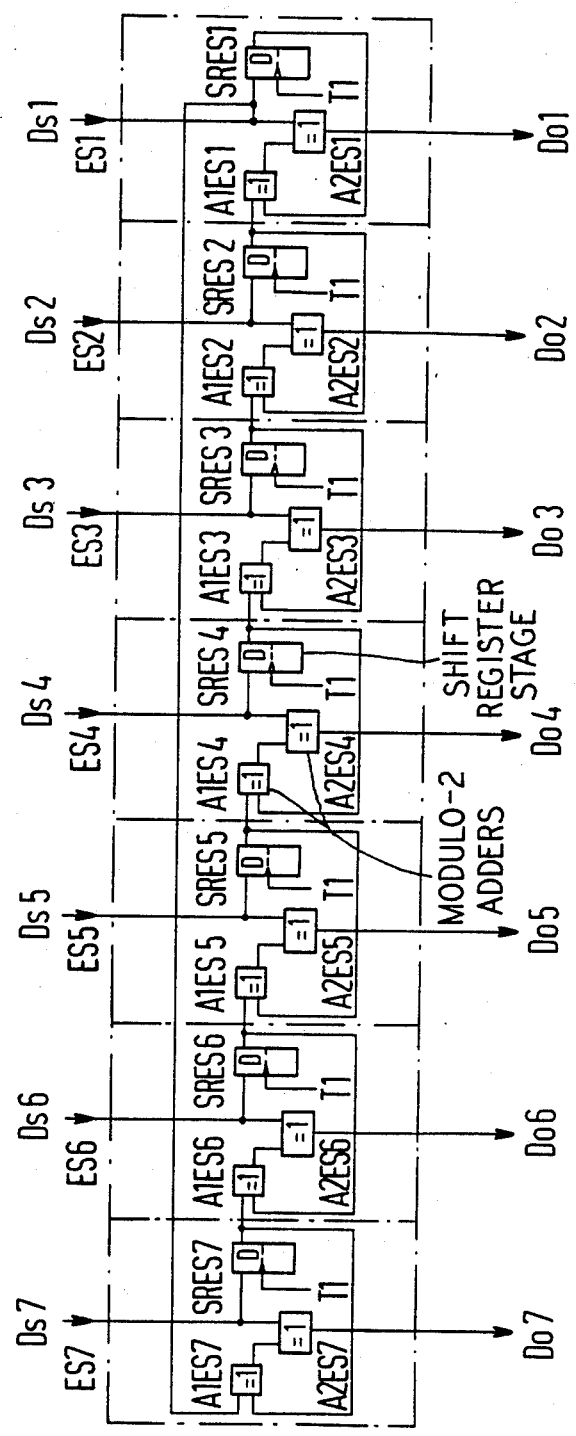
FIG. 2 is a circuit diagram of a seven stage descrambler.

The descrambler stage EO illustrated in FIG. 1 is a portion of an n-stage descrambler. The descrambler stage contains a first modulo-2 adder A1 and a second modulo-2 adder A2 and a shift register stage SR and serves the purpose of descrambling the $n^{th}$ bit of the scrambled digital signal Ds. The first input of the first modulo-2 adder A1 is connected to the Q output of the shift register stage SR of the descrambler stage, whereby the second input of the adder is connected to the output of the shift register stage of the $m^{th}$ descrambler stage and receives a digital signal $Dsx^{-m}$ therefrom. The output of the first modulo-2 adder A1 is connected to the first input of the second modulo-2 adder A2. The second input of the modulo-2 adder A2 is connected to the input for receiving the $n^{th}$ bit of the scrambled digital signal Ds and is also connected to the D input of the shift register stage SR. The output of the second modulo-2 adder A2 represents the output of the descrambler stage at which the descrambled $n^{th}$ bit of the digital signal Do can be taken. The shift register stage SR is clocked with a clock signal T which corresponds to the bit clock of the digital signals divided by the number n of descrambler stages operating in parallel. The output signal of the shift register stage is additionally supplied to the second input of the first modulo-2 adder A1 of a further descrambler stage. The selection of the plurality n of shift register stages operating in parallel is thereby dependent, on the one hand, on the desired reduction in the operating speed and, on the other hand, is dependent on the selected series-to-parallel converter, since the number of outputs corresponds to the plurality n of parallel descrambler stages. Further possibilities can occur in that a plurality of bits of the digital signal yield a code word and are therefore converted in parallel. A corresponding parallel-to-series converter is to be connected downstream for the further serial transmission of the descrambled digital signal. The series-to-parallel conversion and the parallel-to-series conversion thereby need not occur either in bit synchronization or word synchronization. A further reduction in the expense thereby occurs which, together with the possibility of shifting to a more simple and, therefore, less expensive semiconductor technology, facilitate an integration of the descrambler constructed in accordance with the present invention. Given a fixed scrambler period of the digital signals, a descrambler operating in parallel requires the same number of shift register stages as a descrambler operating in series; however, the number of modulo-2 adders required is greater given the parallel descrambler. FIG. 2 illustrates a self-synchronizing descrambler constructed of seven descrambler stages ES1 . . . ES7 of the type illustrated in FIG. 1. A structure analogous to a seven-stage descrambler having a scrambler period of $2^7 - 1 = 127$ bits derives due to the chained circuit. Given a shift direction from left to right, the first bit is descrambled in the first descrambler stage ES1 from the right; the second bit is descrambled adjacent thereto at the left; and, finally, the seventh bit of the scrambled digital signal Ds is descrambled in the descrambler stage ES7. Given the scrambler stage EO shown in FIG. 1, the second input of the modulo-2 adder A1 is connected to the shift register output of the $m^{th}$ descrambler stage. It is here assumed that n=7 and m=n−1=6. Following therefrom is that the second input of the first modulo-2 adder of each stage is respectively connected to the output of the shift register stage of the preceding descrambler stage in the shift direction. The input of the first modulo-2 adder A1ES1 of the first descrambler stage is therefore connected to the output of the shift register stage SRES2 of the second-descrambler stage. This connection occurs correspondingly up to the seventh descrambler stage ES7 to which the first descrambler stage ES1 again is cyclically connected. For equalization of the transit times through the modulo-2 adders, it is not the output signal of the shift register stage SRES1 of the first descrambler stage which is supplied to the first modulo-2 adder A1ES7 of the seventh descrambler stage, but the input signal already pending one clock interval earlier is supplied to the stage. The clock signal T1 for the clocked D flip-flops employed as shift register stages has a frequency which corresponds to one-seventh of the clock frequency of the scrambled digital signals and is generated by a frequency division from their clock signal.

Figure 3:
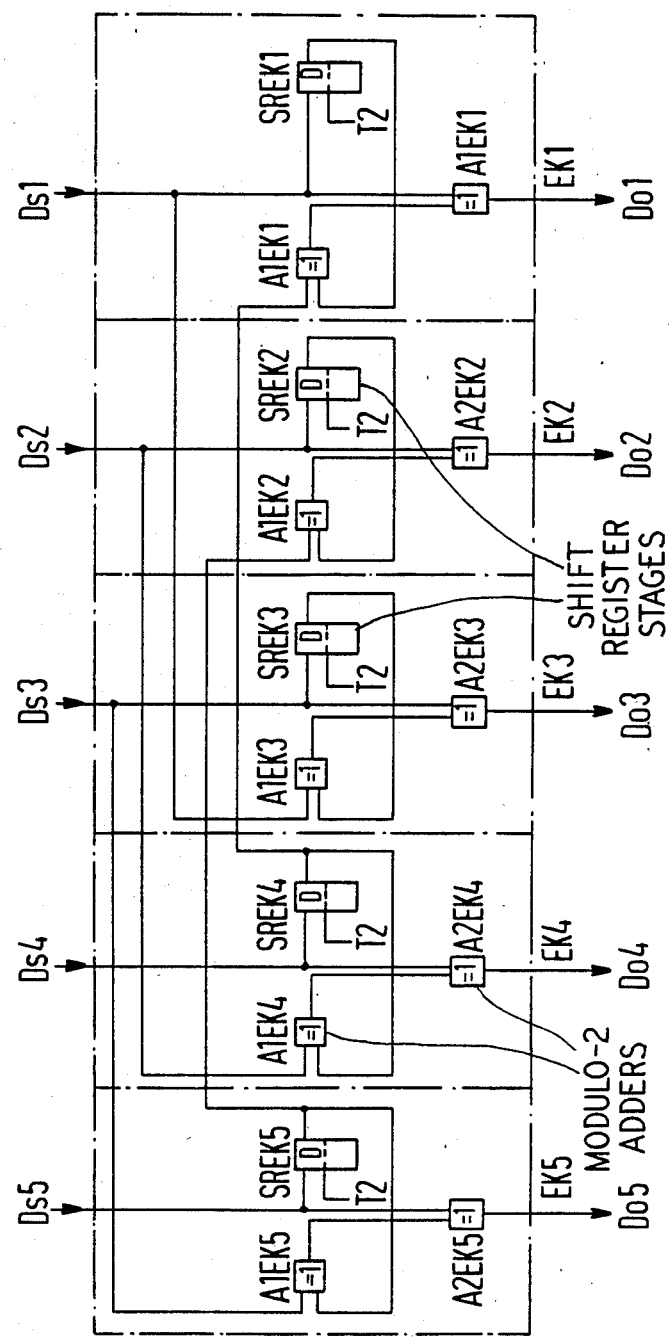
FIG. 3 is a circuit diagram of a five stage descrambler.

FIG. 3 illustrates a five-stage descrambler wherein, therefore, n=5 and wherein m=n−3=2 apply. The individual descrambler stages EK1 . . . EK5 there correspond to the descrambler stage EO shown in FIG. 1; the shift direction is from left to right, so that the first bit is descrambled in the first descrambler stage EK1 and, correspondingly, the fifth bit is descrambled in the fifth descrambler stage EK5. The individual descrambler stages are respectively separately connected to inputs of which a respective bit of the scrambled digital signal Ds1 . . . Ds5 is available. In view of the fact that m=2 is selected, the second input of the first modulo-2 adder A1EK1 is connected to the output of the shift register stage SREK4 of the fourth descrambler stage. Correspondingly, the first modulo-2 adder A1EK2 of the second descrambler stage is connected to the shift register stage SREK5 of the fifth descrambler stage EK5. Since only five descrambler stages are present, the second input of the first modulo-2 adder of the third descrambler stage EK3 is connected to the first descrambler stage EK1 and, correspondingly, the first modulo-2 adder of the fifth descrambler stage EK5 is connected to the second descrambler stage. For equalization of transit times, the second input of the modulo-2 adders are thereby not connected to the outputs, but rather to the inputs, of the shift register stages and receive a signal which appears one clock interval earlier. The shift register stages are likewise composed of clocked D flip-flops; the clock signal T2 has one-fifth the bit clock frequency of the scrambled digital signals and is acquired by frequency division of the recovered clock signal.

The general rule is also therefore true for the five-stage descrambler of FIG. 3 that, in all descrambler stages up to the $(n-m+1)^{th}$ stage, the second input of the first modulo-2 adder of the one descrambler stage is connected to the output of the shift register stage of the descrambler stage for the $m^{th}$ bit, whereby m is smaller than n and is a whole number. After the $(n-m)^{th}$ descrambler stage, the connection then occurs from the second input of the first modulo-2 adder to the input of the shift register stage of the $n^{th}$ descrambler stage; correspondingly, the connection at the $(n-m-1)^{th}$ descrambler stage occurs to the shift register stage of the $(n-1)^{th}$ descrambler stage. A suppression of pulse peaks additionally occurs by taking the descrambled signal at the outputs of the shift register stages.

So that the descrambler does not fall into an undesired short period, a third modulo-2 adder whose free input is connected to a recognition circuit for recognizing short periods can be respectively inserted between the first and second modulo-2 adders of the descrambler stages.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A self-synchronizing descrambler comprising n clocked shift register stages for descrambling a signal having a scrambler period of 2n−1 bits, having a number of parallel operating descrambler stages corresponding to a number of signal inputs and signal outputs and comprising a series circuit of two module-2-adders in connection with a shift register stage, whereby one of the inputs of the second module-to-adders is the input of the corresponding descrambler stage and the output of the same second module-2-adder is the output of the corresponding descrambler stage and the clock inputs (P) of the shift register stages is connected to a source for a clock signal whose frequency is the 1/n-fold portion of the bit clock frequency of the digital signals, characterized in that n parallel inputs for respectively one of n bits of the scrambled digital signal (DS) are provided; in that the inputs are ordered corresponding to the sequence of in-coming bits with the $n^{th}$ bit at the first input and the following bits at the next inputs and are connected to a respective descrambler stage; in that the descrambler stages respectively contain a shift register stage (SR) as well as a first and a second module-2-adder (A1, A2) and the output of the shift register stage (SR) is connected to the first input of the first module-2-adder (A1) and its output is connected to the first input of the second module-2-adder (A2); in that the second input of the second module-2-adder (A2) is connected to the allocated input for the scrambled digital signal and to the input of the shift register stage (SR) contained in the same descrambler stage; in that the output of the second module-2-adder (A2) represents the output of the respective descrambler stage for the descrambled digital signal; in that, in all descrambler stages up to the $(n-m+1)^{th}$, the second input of the first module-2-adder (A1) of the one descrambler stage is connected to the output of the shift register stage of the descrambler stage for the $n^{th}$ bit; in that m is smaller than n and is a whole number; in that, at the $(n-m)^{th}$ descrambler stage, the connection extends from the second input of the first module-2-adder to the input of the shift register stage of the $(n-m-1)^{th}$ descrambler stage to the $(n-1)^{th}$ descrambler stage; in that the individual bits of the descrambled digital signal can be taken at the output of the module-2-adder.

2. A self-synchronizing descrambler according to patent claim 1, characterized in that seven parallel inputs are provided for connection to seven stage outputs of a series-to-parallel convertor whose series input is connected to the source for the scrambled digital signals; in that each of the parallel inputs (Ds1 . . . Ds7) is connected to one of seven descrambler stages (ES1 . . . ES7); in that the second input of the first modulo-2-adder (A1ES7) of the seventh descrambler stage (ES7) is connected to the input of the second modulo-2-adder (A2ES1) of the first descrambler stage (ES1); in that seven parallel outputs (Do1 . . . Do7) are provided for the descrambled digital signal, these being respectively separately connected to the outputs of the second modulo-2-adders of the individual descrambler stages; and in that the shift register stages are connected to a source for a clock signal having a frequency corresponding to 1/7 of the bit clock frequency of the scrambled digital signals (FIG. 2).

3. A self-synchronizing descrambler according to patent claim 1, characterized in that five parallel inputs are provided for parallel processings of five bits of the digital signal to be descrambled; in that the five parallel inputs are respectively separately connected to one of five descrambler stages (EK1 . . . EK5); in that the second input of the first modulo-2-adder (A1EK1) of the first descrambler stage (EK1) is connected to the output of the shift register stage (SREK4) of the fourth descrambler stage (EK4); in that the second input of the first modulo-2-adder (A1EK2) of the second descrambler stage (EK2) is connected to the output of the shift register stage (SREK5) of the fifth descrambler stage (EK5); in that the second input of the first modulo-2-adder (A1EK3) of the third descrambler stage (EK3) is connected to the input of the shift register stage (SREK1) of the first descrambler stage (EK1); in that the second input of the first modulo-2-adder (A1EK4) of the fourth descrambler stage (EK4) is connected to the input of the shift register stage (SREK2) of the second descrambler stage (EK2); in that the second input of the first modulo-2-adder (A1EK5) of the fifth descrambler stage (EK5) is connected to the input of the shift register stage (SREK3) of the third descrambler stage (EK3); and in that the shift register stages are connected to a source for a clock signal having a frequency corresponding to 1/5 of the bit clock frequency of the scrambled digital signals (FIG. 3).

* * * * *